(No Model.)
T. S. FITCH.
FRUIT CARRIER.
No. 521,141. Patented June 5, 1894.
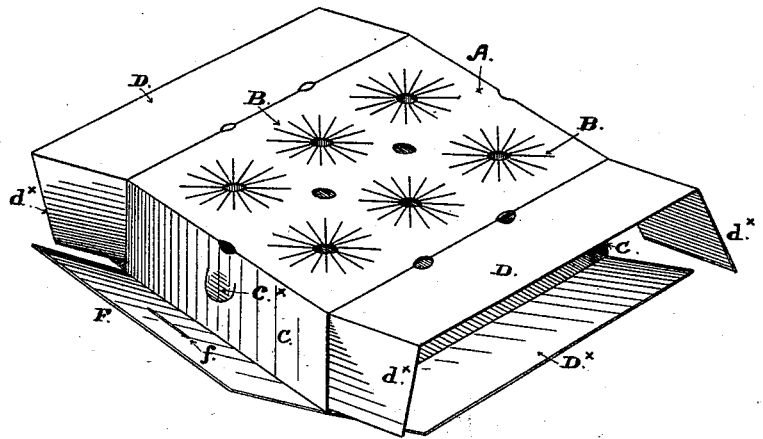
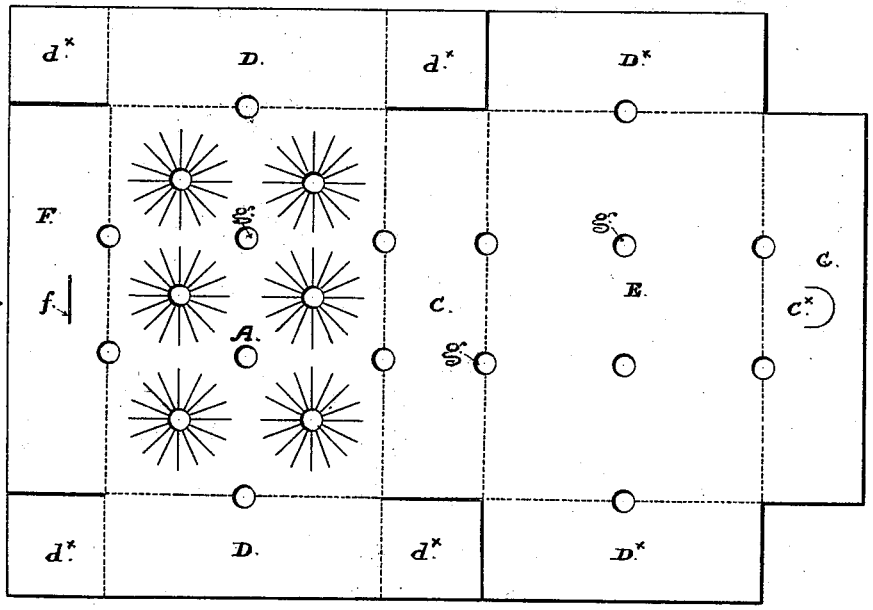
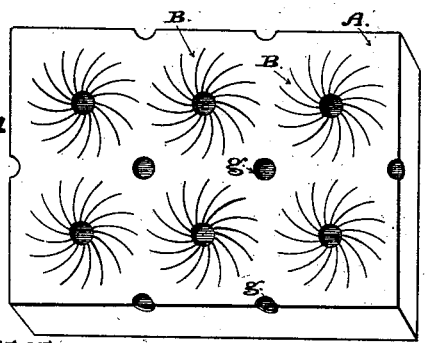
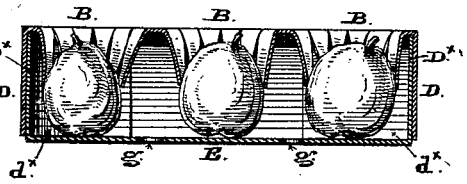
Witnesses:
Inventor:

UNITED STATES PATENT OFFICE.

THADDEUS SHELDON FITCH, OF SAN FRANCISCO, CALIFORNIA.

FRUIT-CARRIER.

SPECIFICATION forming part of Letters Patent No. 521,141, dated June 5, 1894.

Application filed August 25, 1893. Serial No. 484,049. (No model.)

*To all whom it may concern:*

Be it known that I, THADDEUS SHELDON FITCH, a citizen of the United States, residing in the city and county of San Francisco and State of California, have invented certain new and useful Improvements in Fruit-Carriers, of which the following is a specification.

My invention relates to certain improvements made in the egg and fruit carriers for which Letters Patent of the United States No. 503,313 were issued to me on the 15th day of August, 1893.

The objects of the present improvements are to provide better separation and more thorough ventilation between the carriers when a number of them are packed in a crate or box for transportation; to produce a carrier which shall not only separate and hold the fruit out of contact with one another as in my former tray or carrier, already patented, but in addition thereto it will inclose or surround its contents on all sides; thereby forming a carrier that can be packed in a number of tiers or layers in a crate or box for transportation without the use of separating partitions or diaphragms, and will form a package complete in itself for the market.

To such ends and object my present invention consists of a fruit-carrier having fruit-holding pockets, cells or openings, in its top formed of radiating fingers disposed around the opening or mouth of the pocket, and a bottom and sides closing in said pockets and inclosing the contents of the carrier on the sides and bottom; also of a fruit carrier or package having closed sides, top and bottom with fruit-holding pockets, or cells, consisting of separate fingers surrounding the mouth or opening for the fruit and extending all around said opening downward into the space between the top and bottom of the carrier, the said fingers being formed integral with the top of the carrier; also, of a fruit-carrier having fruit-holding pockets or cells, formed as described, with top, bottom and sides of one piece of material, as described.

The accompanying drawings which form part of this specification are referred to by letters.

Figure 1 is a perspective view of my improved carrier illustrating the manner in which the cut blank is folded up, and showing the general form of the carrier before the fruit is placed in its pockets. Fig. 2 is a plan of a blank in which the top, bottom and sides and the pockets, or holders, in the top are cut out of a single piece of material. Fig. 3 is a vertical section of the carrier, illustrating the manner in which the fruit is held in the pockets. Fig. 4 is a top view of a carrier with the fingers cut on spiral lines.

—A— indicates the top of the carrier; —B—B— the pockets or holders; $C$—$C^x$—$D$—$D^x$ are parts forming the standing ends and sides; E— is the bottom and —F— a flap on the outer end of the bottom to lock with the opposite end piece —C— and join the parts together. These parts are creased, or partly cut, or indented for folding along the dotted lines $x\ x$ Fig. 2. The side pieces —D—D— have flaps —$d$—$d^x$— on the ends creased to turn inward at right angles.

When the parts are folded as represented in Fig. 1 the flaps —$d^x$— are turned inside with the parts —D—$D^x$— folded against each other and the end-piece —C— and flap —F— are locked together by a tongue —$C^x$— cut in one and a slit —$f$— cut in the other.

The pockets —B— are formed by cutting a number of slits in the top —A— radiating from a common center, either straight as shown in Fig. 3, or spiral as shown in Fig. 4 to form a number of tapering fingers integral with the material of the top and of proper length to extend downward into the space between the top and bottom of the box when bent inward. The length of the fingers will depend on the size of the pockets to be produced; being made shorter for a pocket of smaller circumference than for one of larger circumference; and as the measure of such circumference is the size or kind of fruit which the carrier is intended to receive, the size of the pocket will also determine the depth of the carrier, or the space between the top and the bottom.

The proportions to observe in most cases should be such that when the fruit is pressed down into the pocket it will lie within the hollow space of the carrier resting on or touching the bottom and being below or flush with the top, while the fingers extending downward surround and grip the fruit on all sides around its greatest circumference. Thus it will be observed that the shape and the size of the fruit are to some extent to be considered in determining the depth and size of pockets in the carriers which are to be manufactured for different kinds of fruit.

Openings —$g$—$g$— are cut in the bottom of the box to secure ventilation of the fruit, but not sufficiently numerous or close together to materially weaken the bottom; although it is not required to support the weight of the fruit directly, as the pressure of the fingers is constantly being exerted against the fruit by virtue of their elasticity and their tendency to assume the horizontal position out of which they are bent when the fruit is pressed down into the pocket. Additional openings for ventilation may also be made in the top in the material between the pockets, as shown in Figs. 1 and 4 where the intervals between the pockets will admit; but such openings may also be omitted.

Both the outline and contour, of the pockets and the number of pockets in this box, or carrier, will be varied according to circumstances. Oval and other forms of these pockets can be produced by varying the lengths of the cut that produces the fingers.

In some cases the side pieces —$D^x$—$D^x$— may be dispensed with such as in carriers of the smaller sizes and where the stationary sides of a single thickness of material would be sufficiently stiff to sustain the top and the additional weight of other carriers when laid in a pile.

By this construction I produce an improved box or carrier that will securely hold the fruit in the best position and under the most favorable conditions for transportation.

By the use of this carrier the expense and labor of wrapping the fruit in papers and of employing packing materials are avoided and a considerable quantity of ripe fruits can be safely packed by placing a number of carriers in tiers or layers and inclosing them in a box or crate. In such case the carriers can be piled directly upon one another without damaging the fruit.

Having thus fully described my invention, what I claim as new, and desire to secure by Letters Patent, is—

1. A fruit carrier constructed with a top having fruit-receiving apertures surrounded by depending fingers integral with the top and extending downward into the space beneath, a bottom joined to said top by vertical sides and ends which support the top at suitable distance above the bottom to produce a receptacle for the fruit, and ventilating apertures in said bottom of relatively small area, whereby the sides, top and bottom constitute a complete inclosure for the fruit and the depending fingers separate and prevent contact between the fruit when in place, substantially as described.

2. A fruit carrying package having a top provided with apertures to insert the fruit, and tapering fingers extending downwardly below the top all around the margin of said apertures, in combination with a closed bottom and standing sides which support said top at a distance above said bottom and join said parts together to form a closed package in which the fruit when inserted through the apertures in the top are entirely inclosed, and ventilating apertures of relatively smaller area than the fruit apertures in said bottom; the top, bottom and vertical sides of said package being integral with one another as hereinbefore described.

In testimony that I claim the foregoing I have hereunto set my hand and seal.

THADDEUS SHELDON FITCH. [L. S.]

Witnesses:
C. W. M. SMITH,
CHAS. E. KELLY.